Feb. 16, 1960

W. LINDQUIST 2,924,906

FISH LURES

Filed Jan. 30, 1956

INVENTOR
WALTER LINDQUIST
By Frederick E. Bromley
ATTY.

2,924,906

FISH LURES

Walter Lindquist, Tecumseh, Ontario, Canada

Application January 30, 1956, Serial No. 562,318

4 Claims. (Cl. 43—42.35)

The present invention relates to improvements in fish lures. A salient object of the invention is to provide a strong but light in weight fish lure so constructed and arranged that when drawn through water in trolling it will tend not only to submerge due to water pressure but will be influenced to oscillate or wiggle in a manner simulating the movement of a natural fish.

Another object of the invention is to provide a fish lure including a hollow body portion, formed of very thin metal, which is substantially conical from its relatively pointed rear extremity for approximately one-half its length, and is closed at its front extremity, which is forwardly and downwardly inclined, by a transversely curved head portion the annual margin of which is soldered or welded to the body portion. Thus the head portion is so formed that water pressure exerted against it depresses the lure, and the rear extremity of the body is so light that it is transversely reciprocated as the lure is drawn through the water.

Having thus briefly stated some of the objects and advantages of the invention I will now describe it in detail with the aid of the accompanying drawing, in which.

Figure 2:
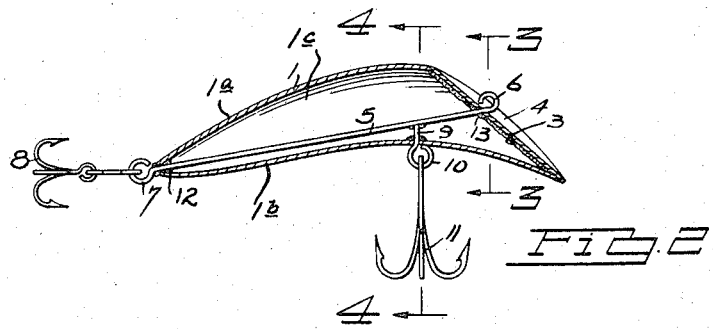
Figure 2 is a section on the line 2—2 of Figure 1.
Figure 3:
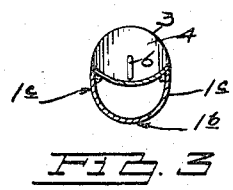
Figure 4:
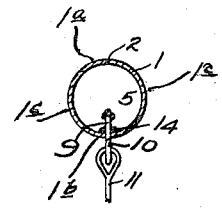

Figures 3 and 4 are sections on the lines 3—3 and 4—4 respectively of Figure 2.

Referring to the drawing, 1 designates the body of my fish lure which is shown as an elongated hollow structure of a circular shape in cross section, and providing top, bottom and side walls 1a, 1b and 1c, respectively. The body diametrically tapers about its longitudinal axis from the head end to the rear end. The rear end is tapered almost to a point and is provided at its terminus with an eye 7. Said body is arched along its longitudinal axis in a vertical plane from its head 4 to a point about three-quarters of the distance along the length of said body-axis, which leaves the remainder of the body-axis straight. The head end of the body is truncated by a head-forming wall 4 which slopes upwardly and rearwardly on a straight line at an acute angle from a lower leading edge and presents an elliptical head surface. The head is transversely concaved on a uniform radius along the length of said straight line. A connecting eye 6 for a leader is disposed on said head at the point of intersection of the body-axis. Referring back to the body arch formation, it will be noted that same is produced by the upward arching of the top and bottom walls 1a, 1b rearwardly from the head wall 4, the arch of top wall 1a being coextensive in length with the latter.

Figure 1:
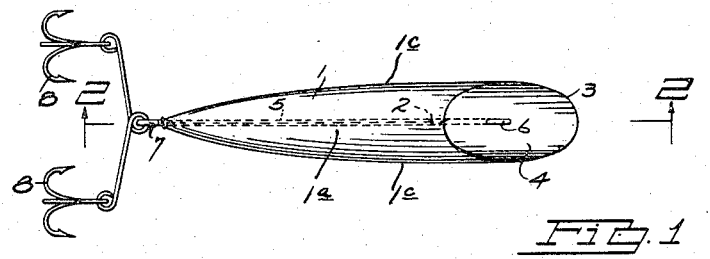
Figure 1 is a plan view of the invention.

Body 1 is preferably formed of thin sheet metal soldered or welded along a line indicated at 2 in the arched top wall 1a as shown in Fig. 1. The head 4 is likewise attached at its margin 3 to the front periphery of the body 1. The transverse concave formation of the head is best shown in Fig. 3. The body when completely fabricated is desirably plated so that it shines, and the soldered or welded joints are rendered invisible.

As depicted in the drawing, a supporting rod 5 is inserted longitudinally through the body so that one end projects centrally through and outwardly beyond the small rear extremity of the body, and the opposite end of the rod extends substantially centrally through and outwardly beyond the head 4. The eye 6 is formed on the front extremity of the supporting rod for attachment to the line (not shown). The eye 7 is formed on the opposite end of the rod and carries the hooks 8. Depending from the supporting rod 5 intermediate of its length and secured thereto within the body 1 is an auxiliary rod 9 which projects downwardly through the body 1 and has an eye 10 formed on its outer extremity to which other hooks 11 are secured. In order to maintain the body watertight the supporting rod 5 is soldered or welded to the rear of the body and to the head where it passes through them as shown at 12 and 13 respectively; and similarly the auxiliary rod 9 is soldered or welded to the body as shown at 14 where it passes therethrough.

The detailed structure illustrated is of particular advantage since supporting rod 5 functions to retain head plate 4 in place. Also the rod 5 cooperates with head plate 4 to provide a truss-like reinforcement for the arch which is provided by top wall 1a, said wall being further reinforced by the seam or weld 2, shown in Fig. 1. Furthermore, the coupling of the auxiliary rod 9 to supporting rod 5 so that eye 10 of the former bears against the exterior surface of the arched portion of bottom wall 1b prevents deformation of body 1. All this means that body 1 can be produced using thinner stock than otherwise.

From the foregoing it will be noted that as the hollow lure is pulled through the water pressure is exerted by the latter against the upwardly and rearwardly inclined head 4 thereby depressing the lure and causing it to submerge. At the same time, due to the rearward taper of the substantially conical rear portion of the body and the fact that the water exerts pressure against the transversely concave head 4 as the lure is drawn along, the tail or back end of the body is rapidly oscillated from side to side. It will be noted that due to the arrangement of the hooks 8 and 11 on the supporting rod 5 on which the eye 6 is also provided for attachment to a line, resultant stresses when a fish is hooked are directly transmitted to the line through the rod. Consequently the body of the lure is largely relieved of stresses arising from the hooking of a fish. Consequently a very thin walled lure body may be successfully employed for catching quite large fish.

What I claim is:

1. A fishing lure comprising in combination a one piece tubeform and transversely and longitudinally hollow main body portion of thin stiff material open at its forward end and closed at its rear end, said body providing side-defining wall portions and transversely curved top and bottom defining wall portions; said main body portion tapering to reduced cross-section from its forward end to its rear end and said top and bottom wall portions being upwardly and longitudinally arched from adjacent said forward end for at least the major portion of said main body portion length; the open forward end of said main body portion being transversely truncated on a rearwardly inclined bias, a closure plate for said open forward body end, securing means for said closure plate and comprising a tie rod extending through the same and said main body portion to project through the closed rear end of the latter, eye-form stops formed at the free ends of said tie rod and bearing exteriorally against said closure plate and closed rear body end, whereby to secure said closure plate in place, said tie rod also acting through said closure plate to provide a supporting truss for said longitudinally arched top-defining wall portion while also tending to maintain the arch form of said bottom defining wall portion, one of said eye-form stops providing means for attachment of a fishing line and the other for a hook, and means anchoring an intermediate portion of said arched bottom wall-defining portion to said tie rod whereby to preserve the arched form of the same.

2. A fishing lure comprising in combination a one piece tubeform and transversely and longitudinally hollow main body portion of thin stiff material open at its forward end and closed at its rear end, said body providing side-defining wall portions and transversely curved top and bottom defining wall portions; said main body portion tapering to reduced cross-section from its forward end to its rear end and said top and bottom wall portions being upwardly and longitudinally arched from adjacent said forward end for at least the major portion of said main body portion length; the open forward end of said main body portion being transversely truncated on a rearwardly inclined bias, a closure plate for said open forward body end, securing means for said closure plate and comprising a tie rod extending through the same and said main body portion to project through the closed rear end of the latter, eye-form stops formed at the free ends of said tie rod and bearing exteriorly against said closure plate and closed rear body end, whereby to secure said closure plate in place, said tie rod also acting through said closure plate to provide a supporting truss for said longitudinally arched top-defining wall portion while also tending to maintain the arch form of said bottom defining wall portion, one of said eye-form stops providing means for attachment of a fishing line and the other for a hook, a hook-mounting eye bearing against an exterior portion of said arched bottom-defining wall portion intermediate the ends of the latter, said eye providing a shank extending through said wall portion, and means anchoring the eye shank to said tie rod, whereby to positively preserve the arched form of said bottom-defining wall portion.

3. A fishing lure comprising in combination a transversely and longitudinally hollow and tubeform main body portion comprising a single blank of thin stiff material, said main body portion being open at its forward end and closed at its rear end, said body portion providing side wall-defining portions and transversely curved top and bottom wall-defining portions; and body portion further tapering to reduced cross-section from its forward end to its rear end and said top and bottom wall portions being upwardly and longitudinally arched from adjacent said forward end for at least the major portion of said body portion length, said body portion-defining blank providing a longitudinally extending stiffening seam in said top-defining wall portion whereby to stiffen the longitudinally arched portion of the latter; the open forward end of said body portion being transversely truncated on a rearwardly inclined bias, a closure plate for said open forward body end, securing means for said closure plate and comprising a tie rod extending through the same and said body portion to project beyond the closed rear end of the latter, eye-form stops formed at the free ends of said tie rod and exteriorally bearing against said closure plate and closed rear body end, said tie rod also acting through said closure plate to provide a supporting truss for said longitudinally arched top-defining wall portion while also tending to maintain the arch form of said bottom-defining wall portion, one of said eye-form stops providing means for attachment of a fishing line and the other for a hook, and means anchoring an intermediate portion of said arched bottom wall-defining portion to said tie rod whereby to preserve the arched form of the same.

4. The structure of claim 3, and said anchoring means comprising a hook-mounting eye bearing against an exterior portion of said arched bottom-defining wall portion intermediate the ends of the latter, and said last mentioned eye having a shank extending through said last mentioned wall portion, and means anchoring the shank to said tie rod, whereby to positively preserve the arched form of said bottom-defining wall portion.

References Cited in the file of this patent

UNITED STATES PATENTS

| | | |
|---|---|---|
| 538,169 | Kelley | Apr. 23, 1895 |
| 1,209,641 | Olds | Dec. 19, 1916 |
| 2,008,437 | DeWitt | July 16, 1935 |
| 2,246,757 | Rosegard | June 24, 1941 |
| 2,262,974 | Steiner | Nov. 18, 1941 |
| 2,522,179 | Jensen | Sept. 12, 1950 |
| 2,641,862 | Poe | June 16, 1953 |
| 2,781,604 | Brown | Feb. 19, 1957 |